United States Patent
Emmerson et al.

(10) Patent No.: US 7,286,836 B2
(45) Date of Patent: Oct. 23, 2007

(54) MOBILE SERVICES

(75) Inventors: Francis Emmerson, Edinburgh (GB); Alex Hannay, London (GB)

(73) Assignee: Nokia Corporation, Espoo (FI)

( * ) Notice: Subject to any disclaimer, the term of this patent is extended or adjusted under 35 U.S.C. 154(b) by 182 days.

(21) Appl. No.: 10/726,811

(22) Filed: Dec. 2, 2003

(65) Prior Publication Data

US 2004/0185872 A1   Sep. 23, 2004

(30) Foreign Application Priority Data

Dec. 27, 2002   (GB) ................. 0230075.4

(51) Int. Cl.
*H04Q 7/20* (2006.01)
*G06F 7/00* (2006.01)
*G06F 15/16* (2006.01)
*G06F 17/00* (2006.01)

(52) U.S. Cl. .............. 455/456.2; 707/3; 709/205; 705/400

(58) Field of Classification Search ........ 455/456.2, 455/406, 405, 407, 408, 558, 556.2; 707/3; 709/205, 224; 705/400, 26
See application file for complete search history.

(56) References Cited

U.S. PATENT DOCUMENTS

| 6,411,813 B1 * | 6/2002 | Sano ................. 455/466 |
| 2001/0023180 A1 * | 9/2001 | Sauer ............... 455/406 |
| 2002/0083145 A1 | 6/2002 | Perinpanathan ....... 709/213 |
| 2003/0137976 A1 | 7/2003 | Zhu et al. ............ 370/354 |
| 2004/0148229 A1 * | 7/2004 | Maxwell ............. 705/26 |

(Continued)

FOREIGN PATENT DOCUMENTS

GB   2369958 A   6/2002

(Continued)

OTHER PUBLICATIONS

Patent Abstracts of Japan, Son Chang Hee, "Method for Offering Game Service with Participation Fee Reward", Pub. No. KR2002047642 A 20020622, Pub. Date Jun. 22, 2002.

(Continued)

*Primary Examiner*—Naghmeh Mehrpour
(74) *Attorney, Agent, or Firm*—Alston & Bird LLP

(57) ABSTRACT

A plurality of clients for different users use on-line services via a mobile communications network in a system comprising: an application database for holding a group of different applications for providing associated services to a client, the applications being configured to provide clients with unlimited off-line use and limited on-line use, an account database for keeping record of the amount of available on-line use of different services provided to the client and an on-line service controller for running on-line services with different clients and for causing the account database to reduce in a predetermined manner the amount of available on-line use when the client uses the on-line service, if the on-line use is allowed. The clients are capable of obtaining a desired application from the application database via the mobile communications network, running the desired application off-line unrestrictedly when desired by the user, and running the application in communication with the on-line service controller using the mobile communications network to use the on-line service associated with the desired application when desired by the user of the client. Corresponding methods, apparatus and computer programs have also been disclosed.

20 Claims, 4 Drawing Sheets

U.S. PATENT DOCUMENTS

2004/0157641 A1* 8/2004 Chithambaram et al. 455/556.2
2005/0004984 A1* 1/2005 Simpson ..................... 709/205
2005/0086211 A1* 4/2005 Mayer .......................... 707/3

FOREIGN PATENT DOCUMENTS

| GB | 2370236 A | 6/2002 |
|---|---|---|
| GB | 2373677 A | 9/2002 |
| KR | 2002021837 | 3/2002 |
| WO | WO 2002/061524 A3 | 8/2002 |

OTHER PUBLICATIONS

Patent Abstracts of Japan, Kim Yeong Don and Woo Jeong Ho, "On-Line Game System Through Data Communication Network and Method for Transmitting/Receiving Game Data", Pub. No. KR2002031510 A 20020502, Pub. Date May 2, 2002.

* cited by examiner

MOBILE SERVICES

FIELD OF THE INVENTION

This invention relates to mobile services. The invention relates particularly, but not exclusively, to a system in which games are provided to a mobile communication device.

BACKGROUND OF THE INVENTION

Modern mobile communication devices have become feature rich platforms even capable to run open platform Java applications and games whilst they still can provide typical communication services such as speech and data services. Better still, it is even possible to add and/or activate new application Over The Air (so called OTA configuration or addition).

The use of OTA may be further divided: into two main categories depending on the target use: stand-alone use without any interaction with the network, such as provision of ring-tones or single player off-line games and provision of content for use with the network, such as distributed multi-player games. Various hybrid forms are also possible, for example a game can be provided that can be played alone in a single player mode or over a network in a multi-player mode so that some other party plays the same game over a network connection.

SUMMARY OF THE INVENTION

According to a first aspect of the invention there is provided a mobile service system comprising a wireless client for a user and a remote service provider unit for providing content to the client, wherein the service provider unit comprises:
  a memory for storing an application usable by the client both off-line and on-line;
  a port for receiving a request for the application from the client and for sending the application to the client;
  a processor for providing on-line use of the application for the client;
  a monitor for monitoring the on-line use of the application;
  a controller configured to control the processor to provide the on-line use of the application dependent on the monitoring; and the client comprising:
  a port for communicating with the service provider unit, configured to send the request to the service provider unit and to receive the application from the service provider unit;
  a processor for off-line running the application whenever desired by the user and for on-line running the application when desired by the user if allowed by the controller.

The system provides a client with mobile reception of an application and allows the user to use the application off-line whenever he or she so desires. The system also allows the on-line use of the application when allowed by the service provider unit.

The desired application may be a game and the associated service may be an on-line game service. The user may practice to an unlimited extent with a game in an off-line mode and only run the game in an on-line mode when electing to start consuming the on-line access.

The monitor may have been configured to keep account of available on-line use of the application and to decrement the available on-line use according to predetermined reduction criterion. The system can thus provide a limited on-line usage and unlimited off-line usage for the application once downloaded The system may further comprise a charging unit configured to collect a monetary charge or payment for the sending of the application and for providing a certain amount of on-line use. Hence, an application can be obtained and used on-line for a certain period with a single charge during and after which the application can be used off-line. This helps to motivate to download applications even despite the cost possible and inconvenience caused by obtaining them.

The memory may comprise a plurality of applications amongst which the client may select an application to be downloaded, for instance, one by one or in batches. The user can thus choose a desired application, such as a game, to down-load and rehearse off-line until the user feels confident to play the game on-line, against other users or a network accessible computer.

The certain amount of on-line use may consist of any one or more of the following options: a predetermined period of time, a predetermined number of on-line accesses and a predetermined number of procedural on-line operations performed. The reduction criterion may contain the circumstances under which the on-line use takes place, such as on-line access data bandwidth, the level of network congestion, the amount of concurrent users, time of day, day of week or any combination thereof. Hence, it is possible to charge the on-line use based on various criterion or criteria so that the user may have a predetermined period of available on-line use, a predetermined number of on-line use sessions or operations (e.g. games to play), and further the charging can adapt to the costs of providing the service, for example by taking into account the prevailing network congestion and the prevailing load on the remote service providing unit.

When determining the available amount of on-line use as a number of on-line accesses, the user may freely choose when to use the associated service on-line without any time pressure. The determining of the available on-line use as a measure of time provides a clear cut-off for the service easy to understand for the user. The determining of the available on-line use as a number of procedure rounds (such as a single game from start to end) is also easy to understand to the user and encourages to use a service on a single round of procedure for as long as the user can and wishes to continue using the service.

The service provider unit may further comprise means for determining a payment of a supplementary charge and increasing by a corresponding amount the available on-line use. This makes it possible to extend the available on-line use of the application.

The service provider unit may consist of a single unit or it may comprise a number of distributed units which may be specialised in particular tasks or may share common tasks.

The functions of the service provider unit may be provided by computer program code executable by one or more computers, by dedicated hardware or by a combination of dedicated hardware and computer program code executable by one or more computers.

The service provider unit may further comprise means for informing the user when the amount of available on-line use is falling below a certain threshold. Thus, the user will not be taken by surprise when running out of the on-line service access and the user may prepare by effecting a supplementary charge in time to avoid discontinuation of the on-line service.

The memory may contain an application database comprising a plurality of different applications.

The content may consist of one or more applications. The content may contain supplementary material that can be added to enhance to use the application, such as new game characters, game levels, sound effects, music and movie trailers.

According to a second aspect of the invention there is provided a method of providing content to a wireless client from a remote service provider unit, comprising:
   storing at the service provider unit an application usable by the client both off-line and on-line;
   transferring a request for the application from the client to the service provider unit;
   sending the application from the service provider unit to the client;
   providing on-line use of the application for the client;
   monitoring the on-line use of the application;
   controlling the providing of the on-line use of the application dependent on the monitoring;
   communicating with the service provider unit to send the request to the service provider unit and to receive the application from the service provider unit;
   off-line running the application whenever desired by the user; and
   on-line running the application when desired by the user if allowed by the service provider unit.

According to a third aspect of the invention there is provided a remote service provider unit for providing content to a wireless client, wherein the service provider unit comprises:
   a memory for storing an application usable by the client both off-line and on-line;
   a port for receiving a request for the application from the client and for sending the application to the client;
   a processor for providing on-line use of the application for the client;
   a monitor for monitoring on-line use of the application; and
   a controller configured to control the processor to provide the on-line use of the application dependent on the monitoring.

The monitor may be a function provided by the processor. The controller may be a function provided by the processor.

According to a fourth aspect of the invention there is provided a method of providing content to a wireless client, comprising:
   storing an application usable by the client both off-line and on-line;
   receiving a request for the application from the client and for sending the application to the client;
   providing on-line use of the application for the client;
   monitoring on-line use of the application; and
   controlling the providing of the on-line use of the application dependent on the monitoring of the on-line use of the application.

According to a fifth aspect of the invention there is provided a wireless client for a mobile service system comprising the client and a remote service provider unit, the client comprising:
   a wireless communication port for communicating with the service provider unit to request for an application from the service provider unit and to receive the application from the service provider unit; and
   a processor for off-line running the application whenever desired by the user and for on-line running the application when desired by the user if allowed by the remote service provider unit.

According to a sixth aspect of the invention there is provided a method of receiving content in a client of a mobile service system comprising the client and a remote service provider unit, comprising the steps:
   communicating with the service provider unit to request for an application from the service provider unit and to receive the application from the service provider unit;
   off-line running the application whenever desired by the user; and
   on-line running the application when desired by the user if allowed by the remote service provider unit.

According to a seventh aspect of the invention there is provided a computer program product comprising means for causing a network entity to perform the method of the fourth aspect. Each method step may be caused by respective computer executable program code for causing the network entity to perform the step.

According to an eighth aspect of the invention there is provided a computer program product comprising means for causing a client to perform the method of the sixth aspect. Each method step may be caused by respective computer executable program code for causing the client to perform the step.

According to a ninth aspect of the invention there is provided a memory media comprising the computer program product of the seventh or eighth aspect.

Advantageously, the functionality of the third or fifth aspect may be provided through a computer program product stored on a memory media.

Preferably, the memory media is a solid state or dynamic memory media, such as a semiconductor memory media, an optical memory media, a magneto-optical memory media or a magnetic memory media. The memory media may be a CD-rom, DVD-rom, a hard disk, a floppy disc, a MiniDisc, a memory card such as an MMC card, SD card, Memory Stick, or an integrated non-volatile memory circuit.

It should be appreciated that the embodiments of any one aspect may produce corresponding advantages when combined with different other aspects as well and that they can be combined where applicable.

BRIEF DESCRIPTION OF THE DRAWINGS

The invention will now be described, by way of example only, with reference to the accompanying drawings, in which.

DETAILED DESCRIPTION

Figure 1:
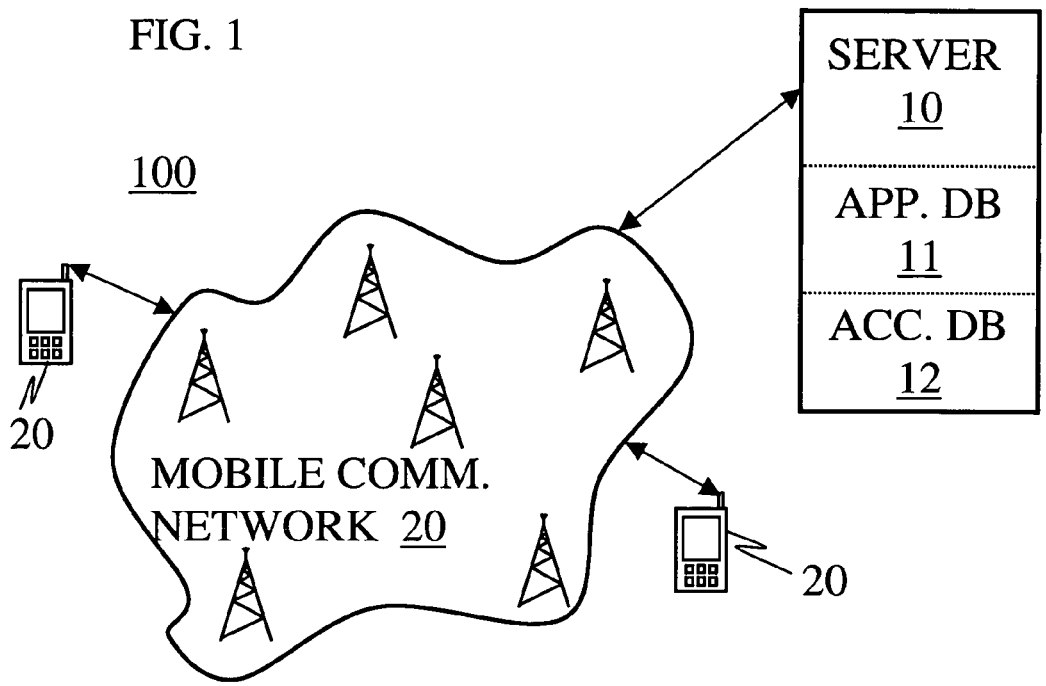
FIG. 1 is a schematic of client-server system in accordance with a preferred arrangement of the present invention.
Figure 2:
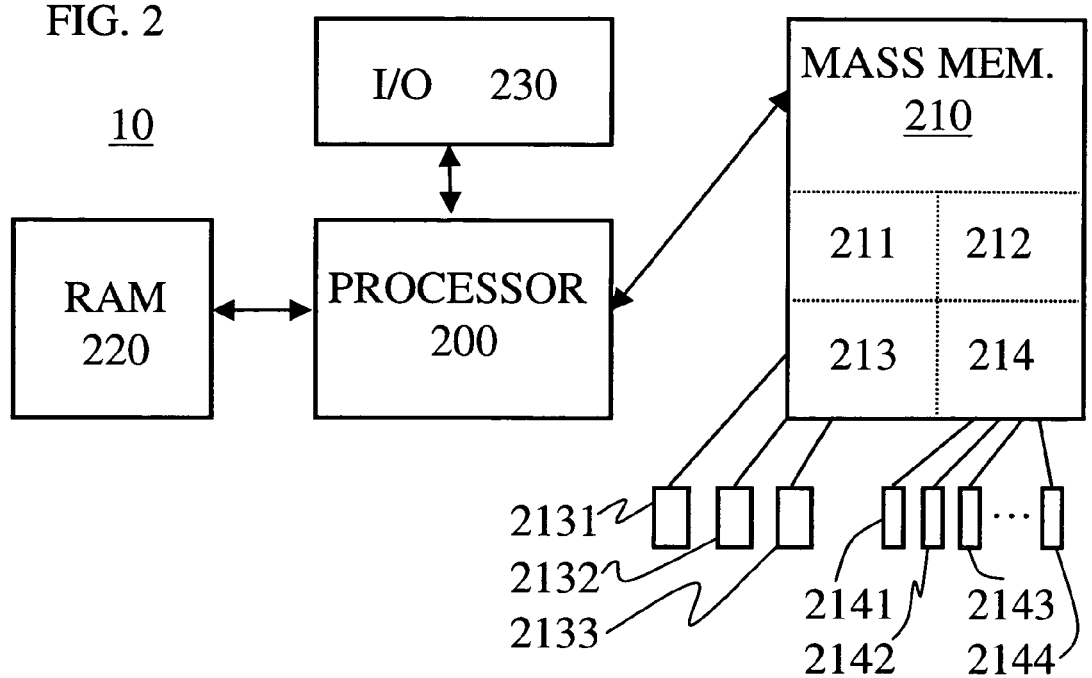
FIG. 2 is a block diagram illustrating selected functional aspects of the server of FIG. 1.

FIG. 1 is a schematic of client-server system 100 in accordance with a preferred arrangement of the present invention. The system comprises a server 10 that controls maintenance of service enabling applications, accounting, delivery of the applications and interoperation with clients using the applications. The system further comprises a plurality of clients 20 which are usually Java™ enabled mobile stations and a mobile communications network 20 through which the clients 20 can communicate with the server 10 and with each other. Additionally, an application database 11 stores a plurality of service enabling applications and an accounting database 12 keeps records of client accounts for different clients, as shown in FIG. 2, to monitor whether a particular client 20 has or still has the right to use a particular service on-line. The application database 11 and accounting database 12 have here been integrated into the server 10.

To overview, the client-server system 100 has been configured to maintain in the application database 11 a group of downloadable applications executable by the clients 20 either off-line or on-line depending on the choices of the users of the clients. On a request from a client 20, the server 10 delivers a desired application against a predetermined charge, grants a predetermined amount of on-line service using the desired application, and maintains on the accounts database a measure of the available on-line service. The user of the client 20 can then use off-line the desired application as much as he or she wishes. The client 20 can also run the desired application on-line in communication with the server 10, but only up to the amount defined by the account of the client 20 stored on the accounts database. The server 10 will reduce the balance on the account corresponding to the on-line in a predetermined manner so that after a predetermined amount of on-line use the desired application can only be used off-line unless a supplementary charge is paid towards further on-line use.

FIG. 2 is a block diagram illustrating selected functional aspects of the server 10 of FIG. 1. The server 10 comprises a processor 200, a mass memory 210, working memory 220, Input/Output (IO) circuitry 230 and programming interface or User Interface (UI) 240. The mass memory 210 contains an operating system 211, a control application 212, an application database 213 and an accounting database 214. The processor 200 has been configured to run the control application 212 and the operating system 211 using the working memory 220 to control various operations of the server 10, for example to control communications in and out through the IO circuitry 230 with clients 20 through the mobile communications network 30 shown in FIG. 1. The application database 213 contains a group of applications 2131 to 2133 corresponding to different applications the server 10 can provide to the clients 20. The account database 214 comprises plural records 2141 to 2144 corresponding to accounts of different clients which have subscribed to a service provided by the server 10, that is clients which have ordered applications from the server 10. In order to spare storage space and to improve information security, the server 10 is preferably so configured that it removes any unnecessary accounts, for example when the balance of an account has become zero.

Figure 3:
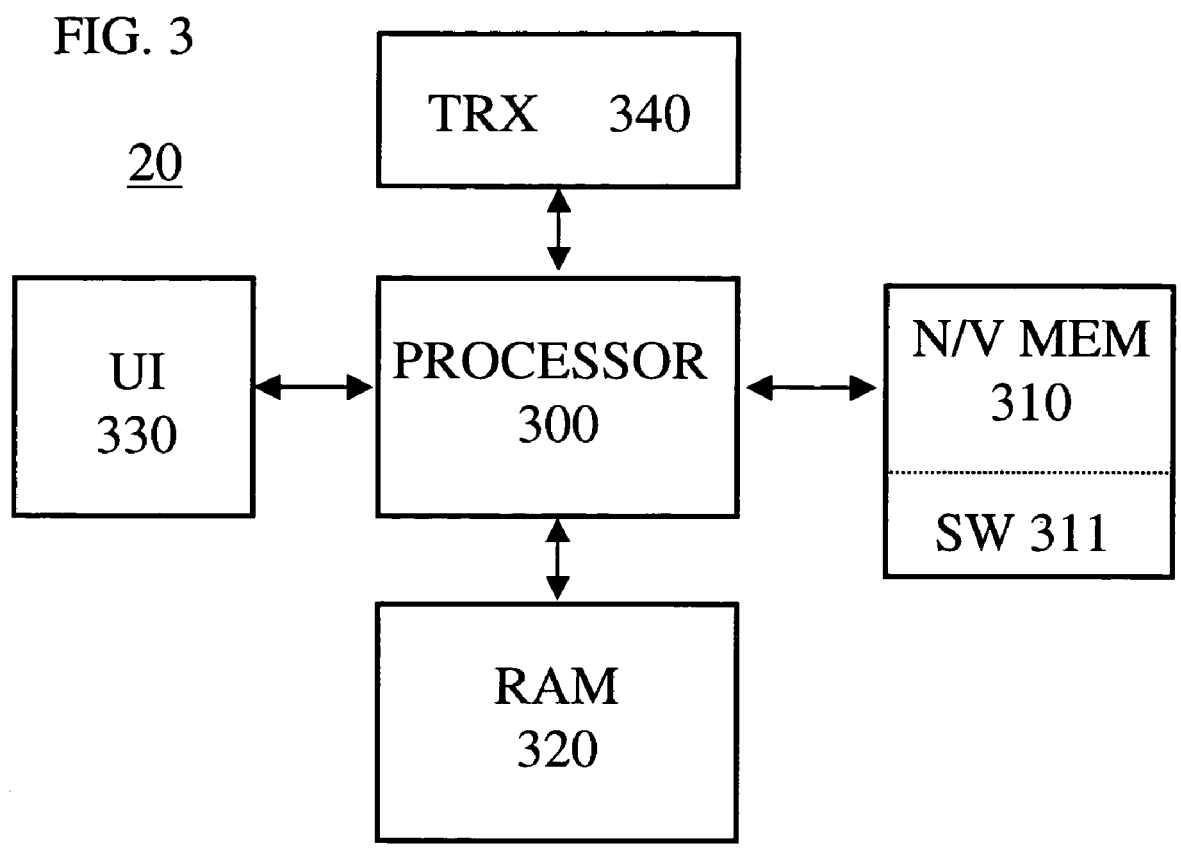
FIG. 3 is a block diagram illustrating selected functional aspects of the client of FIG. 1.

FIG. 3 is a block diagram illustrating selected functional aspects of the client 20 of FIG. 1. The client 20 comprises a processor 300, a non-volatile memory 310 capable of holding computer executable program code or software 311 such as an operating system, various applications and also various settings that should be maintained. The client 20 further comprises a working memory 320 in which the processor can execute the applications and run the operating system, a User Interface 330 for allowing the user to use the client 20, and a radio block 340 providing functions necessary to transport information across the mobile communication network 20.

Figure 4:
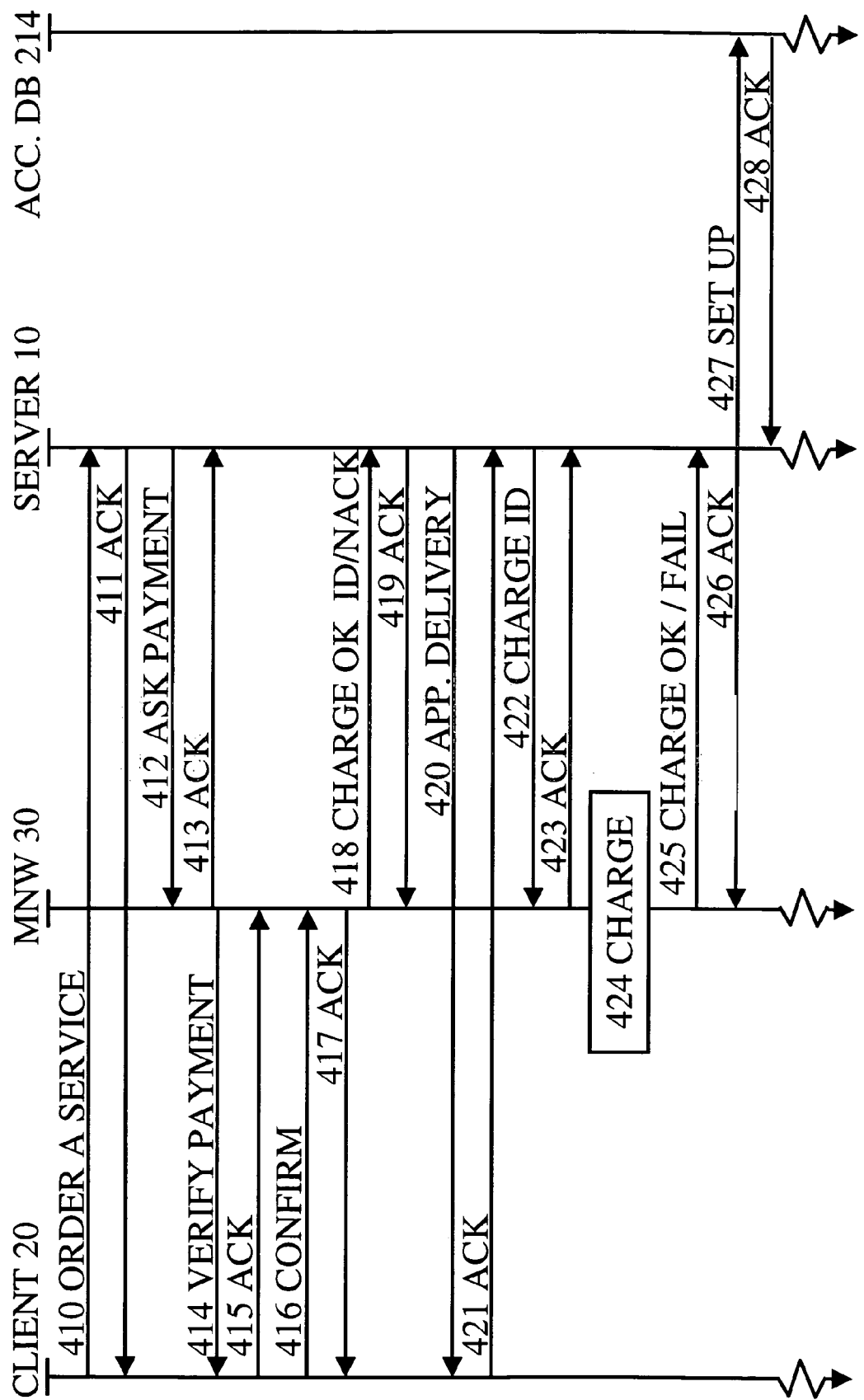
FIGS. 4 and 5 are charts outlining procedures in the client-server system of FIG. 1.
Figure 5:
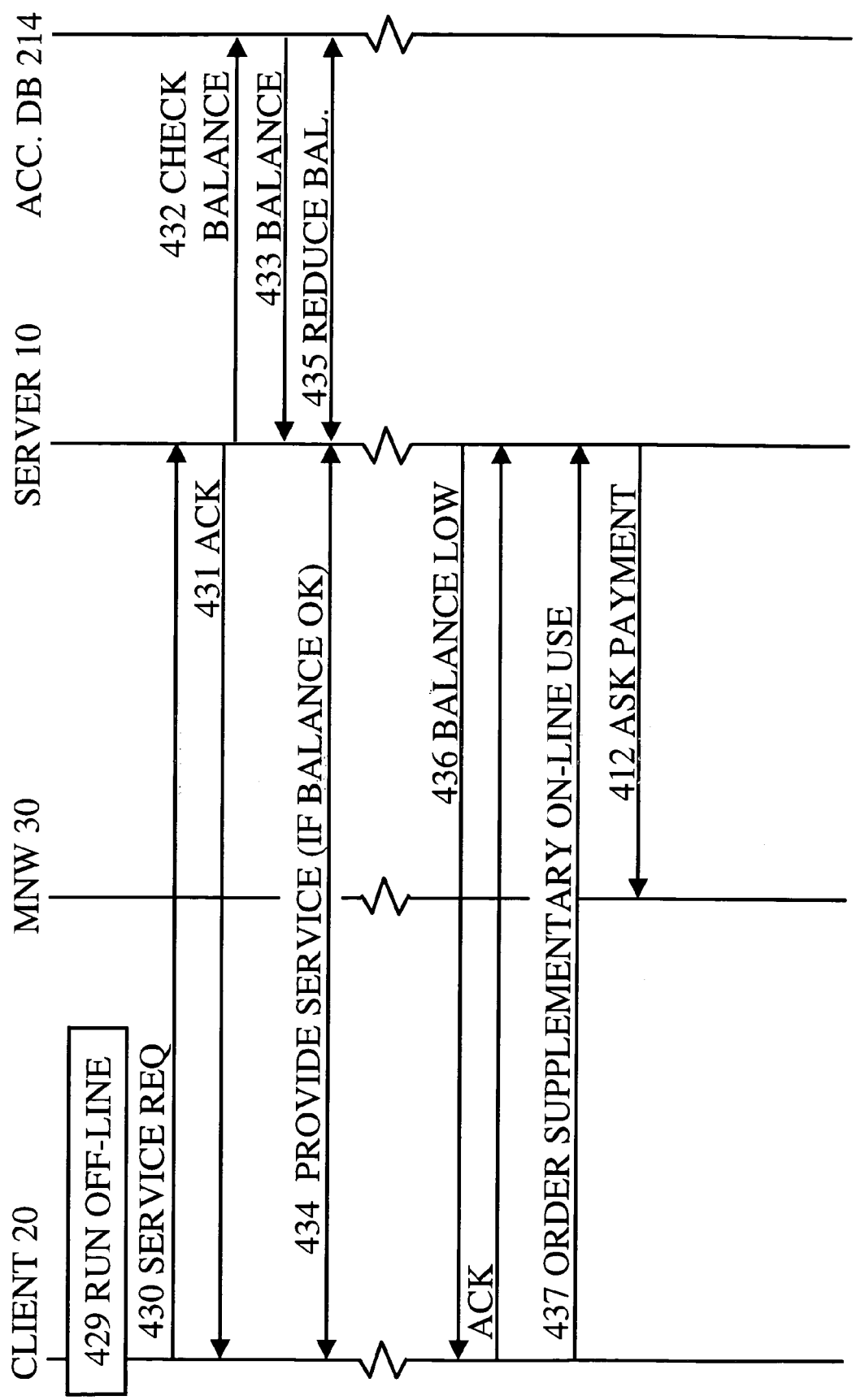

FIGS. 4 and 5 form a continued drawing outlining procedures in the client-server system of FIG. 1. The operation up to providing an application for off-line use is shown in FIG. 4 and subsequent steps are illustrated in FIG. 5. In step 410, the client 20 first orders a service from the server 10. In step 411, the server 10 acknowledges the order. In step 412, the server 10 inquires the mobile communications network 30 to check if it can charge the client 20 for the service. In step 413 the network 30 acknowledges the inquiry. In steps 414 to 417 the network lets the client confirm the intention to pay for the service and the mobile network 30 prepares a charging ID for the server 10 to subsequently effect the charging. In step 418, the network 30 responds to the server 10 with the charging ID if the charging verification with the client 20 completed successfully, or with a NACK if a failure occurred in attempting to setup the charging via the network 30. In step 419 the server 10 acknowledges to the network 30 the receipt of the information for step 418. If the charging ID was received, the server 10 proceeds with the further steps, otherwise the process terminates in the failure to collect the charge or diverts to charge for the service with an alternative way. For example, instead of using an operator based charging method, the client may then pay by using a scratch card pre-purchased by the user or by using a credit or debit card.

In step 420, the server 10 delivers an application 2131 associated with the desired service to the client 20. In step 421, the client 20 sends an ACK to the server 10 after having received the application 2131. The server 20 and mobile communications network 30 then communicate in steps 422 to 426 to effect the charging of the service using the charging ID previously issued by the network 30. Next, in steps 427 to 428 the server 10 sets up an account 2141 for the client 20 corresponding to the desired and ordered service.

In the foregoing it was assumed that the client 20 has not yet established an account with the server 10. However, it may happen that the client wishes to re-download the application if the client has lost the application from its memory, for instance. If an account has already been set up for the client 20, then the server 10 may simply skip the steps 412 to 419 and 423.

After having received the application 2131, the client 20 is able to run the application 2131 off-line in step 429. After steps 427 and 428, the client 20 is also able to start using the service on-line when desired by the user of the client 20. In step 430, the client 20 requests the ordered service to start on-line using it. In step 431, the server 10 acknowledges the request. In step 432, the server checks the account database 214 for the balance on the client's account 2141 and in step 433 the server 10 receives the balance. If the balance is sufficient for providing the service, the server 10 starts in step 434 to provide the on-line service and to reduce the balance in step 435 according to the on-line service use. The server 10 stops providing the service when the balance in the account 2141 no longer suffices to provide further service.

In case of a game, the off-line use refers to the user of the client 20 playing the game by the client without need to interact with the network or the server 10. The on-line use, on the other hand, refers to communicating with the network 30 to play against other users playing with their clients, for example.

The on-line use may refer to receiving new game levels, player details, textures, sounds, music or other content. It should also be appreciated that the client 20 may directly communicate with other clients, as alternative to communicating via the server 10 with other clients, to provide its user with a multi-player game. Even in this case, the server 10 may control the allowed extent of such inter-client communications.

The aforementioned reduction of the balance in step 435 may refer to reducing the balance with a predetermined amount each second, minute, hour, day, or each game played, or each attempt or life lost in a game. The reduction may depend in a predetermined way from the costs of providing the service such that on congestion hours or network congestion or high server 10 load, the charging is faster than when the providing of the service is less expensive. The charging scheme applied is preferably provided to the user of the client 20 for at least an implied approval before starting to provide the on-line use of the service and to charge for the on-line use.

In step 436, the server 10 sends a low-balance warning to the client 10. In step 437 (possible also before the low-balance warning in step 436), the client 10 orders more on-line use from the server 10. The server runs again the steps 412 to 419 and 422 to 426 plus increases the balance corresponding to the supplementary charge made.

The client 20 has been configured to prompt the user with the UI 240 to confirm payment of the supplementary charge and to communicate the response seamlessly to the network 30 on receiving the confirmation from the user, in order to allow extended on-line use with very limited or even minimal manual action, particularly so if the client supports presetting an authorisation of service costs up to a user defined or predetermined maximum limit. Further, even if the user would not wish to pay more for the on-line use, the user will be warned before actually running out of the on-line service. The client 20 may have been configured to freeze the game whilst the playing of the game is interrupted because of the payment of the supplementary charge.

A single client 20 may have a separate account 2141, 2142, . . . for each service subscribed so as to facilitate charging on different rates for different services. Alternatively, a single account may be used to provide and charge the use of different services, for example so that a one account 2141 is assigned to one client or user and another account 2142 is assigned to another client or user.

The present invention may be embodied in other specific forms without departing from its essential attributes. It should be appreciated that the entire detailed description describes a preferred embodiment and can be freely varied by removing, replacing or adding features of this detailed description. That the various features described are optional has not been emphasised for each feature only in sake of clarity and conciseness of the description. Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

The invention claimed is:

1. A mobile service system comprising a wireless client for a user and a remote service provider unit, wherein the service provider unit comprises:
   a memory for storing an application usable at the client in both an off-line mode and an on-line mode, wherein the application is adapted to be usable at the client in an on-line mode only when supported by the service provider unit;
   a port for receiving a request for the application from the client and for sending the application to the client in the form of a downloaded application from the service provider unit to the client;
   a processor for providing support for the use of the downloaded application in an on-line mode at the client;
   a monitor for monitoring the use of the downloaded application in an on-line mode at the client and supported by the service provider unit;
   a controller configured to control the processor to provide support for the use of the downloaded application in an on-line mode at the client, dependent on the monitoring; and the client comprising:
   a port for communicating with the service provider unit, configured to send the request to the service provider unit and to receive the downloaded application from the service provider unit;
   a processor for running the downloaded application in an off-line mode whenever desired by a user of the client and for running the downloaded application in an on-line mode when desired by a user of the client if allowed and supported by the controller, dependent upon the monitoring.

2. A system according to claim 1, wherein the downloaded application is a game application.

3. A system according to claim 1, wherein the monitor has been configured to keep account of available use of the downloaded application in an on-line mode and to decrement the use available in an on-line mode according to predetermined reduction criterion.

4. A system according to claim 1, further comprising a charging unit configured to collect a monetary charge for the sending of the downloaded application and for providing a certain amount of use in an on-line mode at the client.

5. A system according to claim 1, wherein the memory comprises a plurality of applications amongst which the client may select an application to be downloaded.

6. A system according to claim 1, further comprising means for informing the user when the amount of available use of the downloaded application in an on-line mode is falling below a certain threshold.

7. A system according to claim 1, wherein the service provider unit further comprises means for determining a payment of a supplementary charge and increasing by a corresponding amount the available use of the downloaded application in an on-line mode.

8. A method comprising:
   storing at a remote service provider unit an application usable at a wireless client in both an off-line mode and an on-line mode, wherein the application is adapted to be usable at the client in an on-line mode only when supported by the service provider unit;
   communicating with the service provider unit to send the request to the service provider unit and to receive the downloaded application from the service provider unit
   transferring a request for the application from the client to the service provider unit;
   sending the application from the service provider unit to the client in the form of a downloaded application from the service provider unit to the client;
   providing support by the service provider unit for the use of the downloaded application in an on-line mode at the client;
   monitoring the use of the downloaded application in an on-line mode at the client and supported by the service provider unit;

controlling use of the downloaded application in an on-line mode at the client, dependent on the monitoring;

running the downloaded application in an off-line mode at the client whenever desired by a user of the client; and running the downloaded application in an on-line mode at the client and supported by the service provider unit when desired by the user if allowed and supported by the service provider unit, dependent on the monitoring.

9. A remote service provider unit for providing content to a wireless client, wherein the service provider unit comprises:

a memory for storing an application usable at the client in both an off-line and an on-line mode, wherein the application is adapted to be usable at the client in an on-line mode only when supported by the service provider unit;

a port for receiving a request for the application from the client and for sending the application to the client in the form of a downloaded application to the client;

a processor for providing support for the use of the downloaded application in an on-line mode at the client;

a monitor for monitoring the use of the downloaded application in an on-line mode at the client and supported by the service provider unit;

a controller configured to control the processor to provide support for the use of the downloaded application in an on-line mode at the client, dependent on the monitoring.

10. A method, comprising:

storing an application usable at a wireless client in both an off-line and an on-line mode wherein the application is adapted to be usable at the client in an on-line mode only when supported by the service provider unit;

receiving a request for the application from the client and for sending the application to the client in the form of a downloaded application to the client;

providing support by the service provider unit for the use of the downloaded application in an on-line mode at the client;

monitoring use of the downloaded application in an on-line mode at the client and supported by the service provider unit; and controlling the use of the downloaded application in an on-line mode, dependent on the monitoring of the use of the downloaded application in an on-line mode at the client and supported by the service provider unit.

11. A wireless client for a mobile service system comprising the client and a remote service provider unit, the client comprising:

a wireless communication port adapted to communicate with the service provider unit to request a download of an application from the service provider unit and to receive the downloaded application from the service provider unit, wherein the application is adapted to be usable at the client in an on-line mode only when supported by the remote service provider unit; and a processor adapted to run the downloaded application in an off-line mode at the client whenever desired by the user and for running the downloaded application in an on-line mode at the client and supported by the service provider unit when desired by a user of the client if allowed and supported by the remote service provider unit.

12. A method comprising:

communicating with a service provider unit of a mobile service system to request a download of an application from the service provider unit to a wireless client and to receive the downloaded application at the client from the service provider unit, wherein the application is adapted to be usable at the client in an on-line mode only when supported by the service provider unit;

running the downloaded application in an off-line mode at the client whenever desired by a user of the client; and running the downloaded application in an on-line mode at the client and supported by the service provider unit when desired by a user of the client if allowed and supported by the remote service provider unit.

13. A computer program product comprising a computer-readable storage medium having computer executable program code stored therein, the computer program product comprising:

computer executable program code configured to enable the network entity to store an application usable at a wireless client in both an off-line mode and an on-line mode, wherein the application is adapted to be usable at the client in an on-line mode only when supported by the service provider unit;

computer executable program code configured to enable the network entity to receive a request for download of the application from the client and for sending the application to the client in the form of a downloaded application from the network entity to the client;

computer executable program code configured to enable the network entity to provide support by the service provider unit for the use of the downloaded application in an on-line mode at the client;

computer executable program code configured to enable the network entity to monitor use of the downloaded application in an on-line mode at the client and supported by the service provider unit; and computer executable program code configured to enable the network entity to control the providing of the use of the downloaded application in an on-line mode, dependent on the monitoring of the use of the application in an on-line mode and supported by the service provider unit.

14. A computer program product comprising a computer-readable storage medium having computer executable program code stored therein, the computer program product comprising:

computer executable program code configured to enable the wireless client to communicate with a service provider unit of a mobile service system to request a download of an application from the service provider unit to a wireless client and to receive the application at the client from the service provider unit in the form of a downloaded application from the service provider unit to the client wherein the application is adapted to be usable at the client in an on-line mode only when supported by the service provider unit; and computer executable program code configured to enable the wireless client to run the downloaded application in an off-line mode at the client whenever desired by the user and in an on-line mode at the client and supported by the service unit provider when desired by a user of the client if allowed and supported by the remote service provider unit.

15. A memory media comprising a computer program product, the memory media comprising:
- computer executable program code configured to enable the network entity to store an application usable at the a wireless client in both an off-line mode and an on-line mode, wherein the application is adapted to be usable at the client in an on-line mode only when supported by the service provider unit;
- computer executable program code configured to enable the network entity to receive a request for the download of the application from the client and for sending the application to the client in the form of a downloaded application from the network entity to the client;
- computer executable program code configured to enable the network entity to provide support by the service provider unit for the use of the downloaded application in an on-line mode at the client;
- computer executable program code configured to enable the network entity to monitor use of the downloaded application in an on-line mode and supported by the service provider unit; and
- computer executable program code configured to enable the network entity to control the providing support for the use of the downloaded application in an on-line mode, dependent on the monitoring of the use of the downloaded application in an on-line mode and supported by the service provider unit.

16. A memory media comprising a computer program product, the memory media comprising:
- computer executable program code configured to enable the wireless client to communicate with a service provider unit of a mobile service system to request the a download of an application from the service provider unit to a wireless client and to receive the application at the client from the service provider unit in the form of a downloaded application from the service provider unit to the client wherein the application is adapted to be usable at the client in an on-line mode only when supported by the service provider unit; and
- computer executable program code configured to enable the wireless client to run the downloaded application in an off-line mode at the client whenever desired by the user and in an on-line mode at the client and supported by the service provider unit when desired by a user of the client if allowed and supported by the remote service provider unit.

17. The system according to claim 1, wherein the wireless client further comprises a separate control application adapted to provide a connection between the client and the service provider unit and adapted to control the download of the downloaded application from the service provider unit to the client.

18. The system according to claim 17, wherein the memory comprises a plurality of applications amongst which the client may select an application to be downloaded, and wherein the control application is further adapted to permit the client to obtain a desired application from amongst the plurality of applications in the memory.

19. The system according to claim 1, wherein the processor for providing support for the use of a downloaded application in an on-line mode at the client is further adapted to provide use of the downloaded application in an on-line mode at the client with another client, thereby providing inter-client communications and use of the downloaded application, and wherein the monitor is further adapted to monitor the inter-client use of the downloaded application in an on-line mode at the client and supported by the service provider unit.

20. The system according to claim 1, wherein the downloaded application is a game, wherein the memory is further adapted to store additional levels for the game apart from those included with the downloaded application, wherein the port is further adapted to send one or more of the additional levels for the game to the client, and wherein the monitor is further adapted to monitor the downloading of the additional levels for the game as use of the downloaded application in an on-line mode at the client and supported by the service provider unit.

* * * * *

UNITED STATES PATENT AND TRADEMARK OFFICE
CERTIFICATE OF CORRECTION

PATENT NO. : 7,286,836 B2  Page 1 of 1
APPLICATION NO. : 10/726811
DATED : October 23, 2007
INVENTOR(S) : Emmerson et al.

It is certified that error appears in the above-identified patent and that said Letters Patent is hereby corrected as shown below:

Column 11,

Line 32, cancel "the"

Signed and Sealed this

Twenty Second Day of April, 2008

JON W. DUDAS
*Director of the United States Patent and Trademark Office*